(12) United States Patent
Pravanh et al.

(10) Patent No.: US 10,533,603 B2
(45) Date of Patent: Jan. 14, 2020

(54) ROLLER TRACK ASSEMBLY FOR A TILTROTOR PROPROTOR DOOR

(71) Applicant: Bell Helicopter Textron Inc., Fort Worth, TX (US)

(72) Inventors: Nick Pravanh, Fort Worth, TX (US); Michael E. Rinehart, Euless, TX (US); Bart Shafer, Fort Worth, TX (US); Clegg Smith, Keller, TX (US); Bruce B. Bacon, Euless, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 366 days.

(21) Appl. No.: 15/448,415

(22) Filed: Mar. 2, 2017

(65) Prior Publication Data

US 2018/0252263 A1    Sep. 6, 2018

(51) Int. Cl.
*F16C 29/00* (2006.01)
*B64C 29/00* (2006.01)
*B64D 29/02* (2006.01)
*F01D 15/12* (2006.01)
(Continued)

(52) U.S. Cl.
CPC ........ *F16C 29/005* (2013.01); *B64C 29/0033* (2013.01); *B64C 29/0091* (2013.01); *B64D 29/02* (2013.01); *F01D 15/02* (2013.01); *F01D 15/12* (2013.01); *F16C 29/002* (2013.01); *F16C 29/007* (2013.01); *E05D 15/0686* (2013.01); *F05D 2220/90* (2013.01); *F05D 2260/40311* (2013.01); *F05D 2260/53* (2013.01); *F16C 2204/20* (2013.01); *F16C 2204/72* (2013.01); *F16C 2208/82* (2013.01); *F16C 2326/43* (2013.01)

(58) Field of Classification Search
CPC ... B64C 1/1438; B64C 1/1461; B64C 1/1466; B64D 29/02; F16C 29/008
See application file for complete search history.

(56) References Cited

U.S. PATENT DOCUMENTS

| 2,921,146 A | 1/1960 | Ericson |
| 3,392,244 A | 7/1968 | Hillmann |
| 3,666,209 A | 5/1972 | Taylor |

(Continued)

FOREIGN PATENT DOCUMENTS

| EP | 2497402 A2 | 9/2012 |
| EP | 3369654 A1 | 9/2018 |

(Continued)

OTHER PUBLICATIONS

European Search Report, dated Feb. 27, 2018, by the EPO, re EP Patent Application No. 17197812.5.

(Continued)

*Primary Examiner* — J. Woodrow Eldred
(74) *Attorney, Agent, or Firm* — Timmer Law Group, PLLC (57) ABSTRACT

A door track assembly for cooperation with a door roller mechanism, including a housing having a longitudinal channel along a length of the housing, wherein the channel descends at an end of the housing to form a stowage recess for the door roller mechanism, and a first track and a second track that are disposed on the housing along a length of the channel and that descend into the stowage recess and along which the door roller mechanism traverses.

10 Claims, 12 Drawing Sheets

(51) Int. Cl.
   *F01D 15/02*   (2006.01)
   *E05D 15/06*   (2006.01)

(56) References Cited

U.S. PATENT DOCUMENTS

| | | | |
|---|---|---|---|
| 4,037,809 A | 7/1977 | Legrand | |
| 4,172,423 A | 10/1979 | Monne | |
| 6,098,342 A | 8/2000 | Bischof et al. | |
| 6,260,793 B1 | 7/2001 | Balayn et al. | |
| 6,382,556 B1 | 5/2002 | Pham | |
| 9,126,678 B2 | 9/2015 | Ross et al. | |
| 9,174,731 B2 | 11/2015 | Ross et al. | |
| 9,199,732 B2 | 12/2015 | Isaac et al. | |
| 2001/0037613 A1 | 11/2001 | Owens | |
| 2005/0045762 A1 | 3/2005 | Pham | |
| 2008/0066259 A1 | 3/2008 | Prieur | |
| 2009/0307981 A1 | 12/2009 | Loidolt | |
| 2010/0059628 A1 | 3/2010 | Kobayashi et al. | |
| 2011/0089714 A1 | 4/2011 | Kitayama | |
| 2015/0165759 A1* | 6/2015 | Landa | B41J 2/0057 347/103 |
| 2018/0251227 A1 | 9/2018 | Ross et al. | |
| 2018/0252264 A1 | 9/2018 | Pravanh et al. | |
| 2019/0092485 A1 | 3/2019 | Decker et al. | |

FOREIGN PATENT DOCUMENTS

| | | | |
|---|---|---|---|
| EP | 3369659 A1 | 9/2018 | |
| EP | 3378767 A1 | 9/2018 | |
| EP | 3369659 B1 | 1/2019 | |
| EP | 3378767 B1 | 1/2019 | |
| FR | 2892142 A1 | 4/2007 | |

OTHER PUBLICATIONS

European Exam Report, dated Mar. 12, 2018, by the EPO, re EP Patent Application No. 17197812.5.
EP Search Report, dated Feb. 27, 2018, by the EPO, re EP Patent App No. 17197649.1.
EP Exam Report, dated Mar. 12, 2018, by the EPO, re EP Patent App No. 17197649.1.
Invitation pursuant to Rule 62a(1) EPC, dated Mar. 1, 2018, by the EPO, re EP Patent App No. 17197811.7.
Partial EP Search Report, dated May 2, 2018, by the EPO, re EP Patent App No. 17197811.7.
EP Exam Report, dated May 25, 2018, by the EPO, re EP Patent App No. 17197811.7.
Canadian Office Action, dated Oct. 1, 2018, by the CIPO, re CA Patent App No. 2,986,741.
EP Communication under Rule 71(3) EPC—Intention to Grant, dated Sep. 28, 2018, by the EPO, re EP Patent App No. 17197649.1.
EP Communication under Rule 71(3) EPC—Intention to Grant, dated Oct. 10, 2018, by the EPO, re EP Patent App No. 17197812.5.
EP Exam Report, dated Nov. 19, 2018, by the EPO, re EP Patent App No. 17197811.7.
EP Decision to Grant, dated Dec. 6, 2018, by the EPO, re EP Patent App No. 17197649.1.
EP Decision to Grant, dated Dec. 6, 2018, by the EPO, re EP Patent App No. 17197812.5.
Communication under Rule 71(3) EPC—Intention to Grant, dated May 23, 2019, by the EPO, re EP Patent Application No. 17197811.7.
Office Action, dated Jun. 17, 2019, by the USPTO, re U.S. Appl. No. 15/448,136.
CA Office Action, dated Jul. 23, 2019, by the CIPO, re CA Patent App No. 2,986,741.
Notice of Allowance, dated Oct. 2, 2019, by the USPTO, re U.S. Appl. No. 15/448,136.

* cited by examiner

ROLLER TRACK ASSEMBLY FOR A TILTROTOR PROPROTOR DOOR

BACKGROUND

Technical Field

The present disclosure relates to an aircraft, and more particularly, to a tiltrotor aircraft having a door roller (bogie) mechanism for cooperation with a roller track assembly for dampening undesirable lateral vibrations of a movable PRGB door during aircraft operation.

Description of Related Art

Certain tiltrotor aircraft, such as the Bell Helicopter Valor V-280 tiltrotor aircraft, employ a nacelle propulsion system on a wing member with a fixed portion that encloses an engine and a movable (rotatable) proprotor gearbox (PRGB) system that drives the rotor blades. The PRGB system is rotatable relative to the fixed portion of the nacelle to convert between a vertical flight mode and a forward flight mode and vice versa. A PRGB door is connected at one end to the PRGB system by hinge fittings 208, shown in FIG. 5, that permit rotation thereof and is connected at the other end to a bogie mechanism and roller track assembly in a manner that the PRGB door moves between closed and open positions in response to rotation of the movable PRGB system.

In operation of such tiltrotor aircraft, down wash from the rotors in the vertical flight mode, or in a conversion mode, as well as vibrations transmitted from the PRGB can cause unwanted lateral vibrations of the PRGB door.

There is a need for an improved door connection mechanism that is effective to dampen such lateral vibrations of the PRGB door during aircraft operation.

SUMMARY

In one aspect, a door track assembly for cooperation with a door roller mechanism, including a housing having a longitudinal channel along a length of the housing, wherein the channel descends at an end of the housing to form a stowage recess for the door roller mechanism, and a first track and a second track that are disposed on the housing along a length of the channel and that descend into the stowage recess and along which the door roller mechanism traverses.

In an embodiment, the first track and the second track include a respective first sidewall and second sidewall, the first sidewall and the second sidewall having an anti-friction coating thereon.

In another embodiment, each anti-friction coating can be a matrix material and an anti-friction polymer material in the matrix.

In one embodiment, the matrix material can be an anodized layer.

In still another embodiment, the polymer material can include polytetrafluoroethylene particles.

In an embodiment, the first track and the second track each has an upwardly facing wear insert thereon and a downwardly facing wear insert thereon.

In yet another embodiment, each wear insert provides a wear resistant roller track surface.

In one embodiment, the channel includes an entry end having a converging entrance leading to a descending ramp insert.

In an embodiment, a cover member is disposed on top of the entry end.

In a second aspect, there is a combination of an aircraft nacelle and the door track assembly mounted to the nacelle.

In an embodiment, the aircraft nacelle is a fixed engine nacelle.

In one embodiment, the fixed engine nacelle is disposed on a wing member of a tiltrotor aircraft.

In yet another embodiment, the aircraft nacelle further includes a movable proprotor gearbox system.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the door roller mechanism for cooperation with a roller track assembly and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
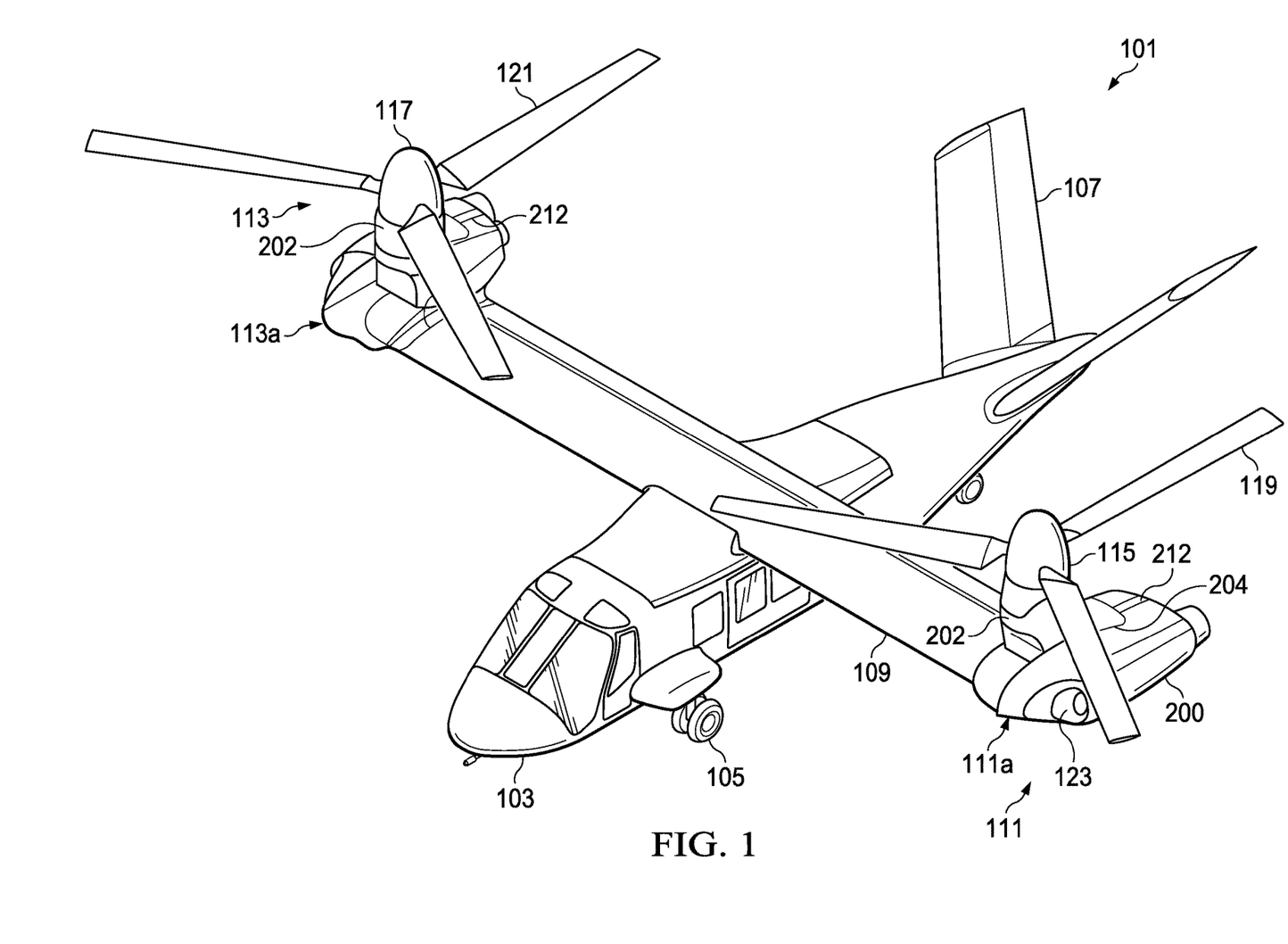
FIG. 1 is a perspective view of a tiltrotor aircraft in the vertical flight mode (helicopter mode), according to one example embodiment.
Figure 2:
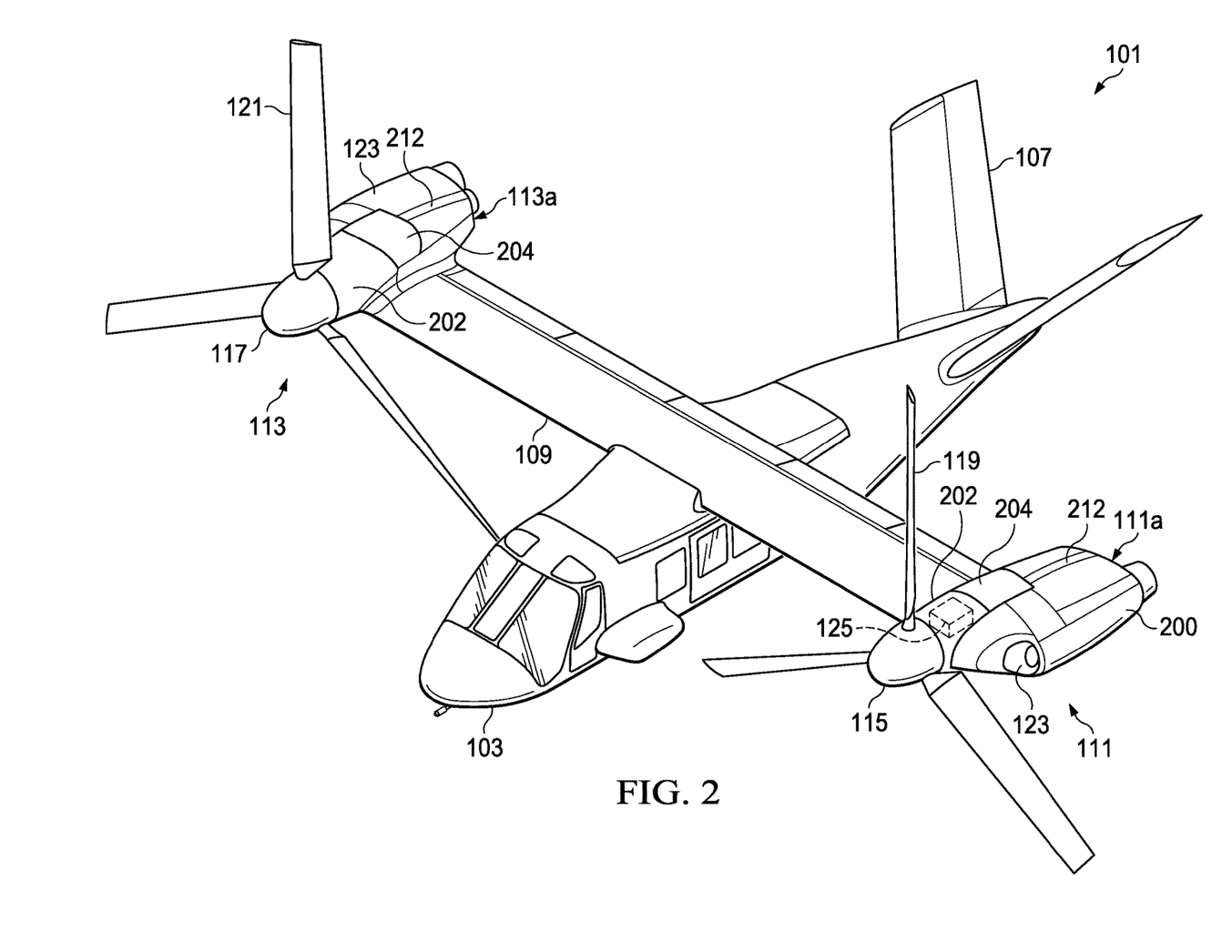
FIG. 2 is a perspective view of a tiltrotor aircraft in the forward flight mode (airplane mode), according to one example embodiment.

Referring to FIGS. 1 and 2 in the drawings, a tiltrotor aircraft 101 is illustrated. Tiltrotor aircraft 101 can include a fuselage 103, a landing gear 105, a tail member 107, and a wing member 109, a propulsion system 111, and a propulsion system 113. Each propulsion system 111 and 113 is housed within a nacelle 111a and 113a that includes a fixed portion with an engine and a rotatable gearbox proprotor system 115 and 117 respectively. Each rotatable proprotor gearbox system 115 and 117 has a plurality of rotor blades 119 and 121, respectively. The position of the rotatable proprotor gearbox systems 115 and 117 as well as the pitch of the rotor blades 119 and 121, can be selectively controlled in order to selectively control direction, thrust, and lift of the tiltrotor aircraft 101.

FIG. 1 illustrates tiltrotor aircraft 101 in the vertical flight mode (helicopter mode), in which the rotatable proprotor gearbox systems 115 and 117 are positioned substantially vertical to provide a lifting thrust. FIG. 2 illustrates tiltrotor aircraft 101 in a forward flight mode (airplane mode), in which the rotatable proprotor gearbox systems 115 and 117 are positioned substantially horizontal to provide a forward thrust in which a lifting force is supplied by the wing member 109. It should be appreciated that tiltrotor aircraft can be operated such that rotatable proprotor gearbox systems 115 and 117 are selectively positioned between the airplane mode and the helicopter mode, which can be referred to as a conversion mode.

The propulsion system 113 is substantially symmetric to the propulsion system 111; therefor, for the sake of efficiency certain features will be disclosed only with regard to propulsion system 111. However, one of ordinary skill in the art would fully appreciate an understanding of propulsion system 113 based upon the disclosure herein of propulsion system 111.

Further, propulsion systems 111 and 113 are illustrated in the context of tiltrotor aircraft 101; however, propulsion systems 111 and 113 can be implemented on other tiltrotor aircraft. For example, an alternative embodiment may include a quad tiltrotor that has an additional wing member aft of the wing member 109, the additional wing member can have additional propulsion systems similar to propulsion systems 111 and 113. In another embodiment, propulsion systems 111 and 113 can be used with an unmanned version of tiltrotor aircraft 101. Further, propulsion system 111 and 113 can be integrated into a variety of tiltrotor configurations.

In the illustrated embodiments, each propulsion system 111 and 113 is shown including an engine 123 that is in the fixed relative to wing member 109 and power transmission system including a proprotor gearbox (PRGB) 125 to drive the rotor blades 119 and 121, all as disclosed in U.S. Pat. No. 9,174,731, the entire content of which is hereby incorporated by reference.

In the illustrated embodiments, each of the nacelles 111a and 113a includes a fixed portion 200 (fixed relative to the wing member) and a movable proprotor housing 202 at each of the respective outboard ends of wing member 109. The movable proprotor housing 202 of the respective nacelle encloses the engine, such as for example a turbine engine, and parts of a torque transfer mechanism that provides power to the proprotor gearbox (PRGB) 125 that is enclosed by a movable proprotor housing 202. The proprotor housing 202 rotates relative to the fixed portion 200 of the nacelle as the aircraft transitions between the forward flight mode (airplane mode) and the vertical flight mode (helicopter mode). The rotor blades 119 and 121 are driven by an output shaft of the PRGB as described in aforementioned U.S. Pat. No. 9,174,731 that is incorporated herein by reference.

Figure 3:
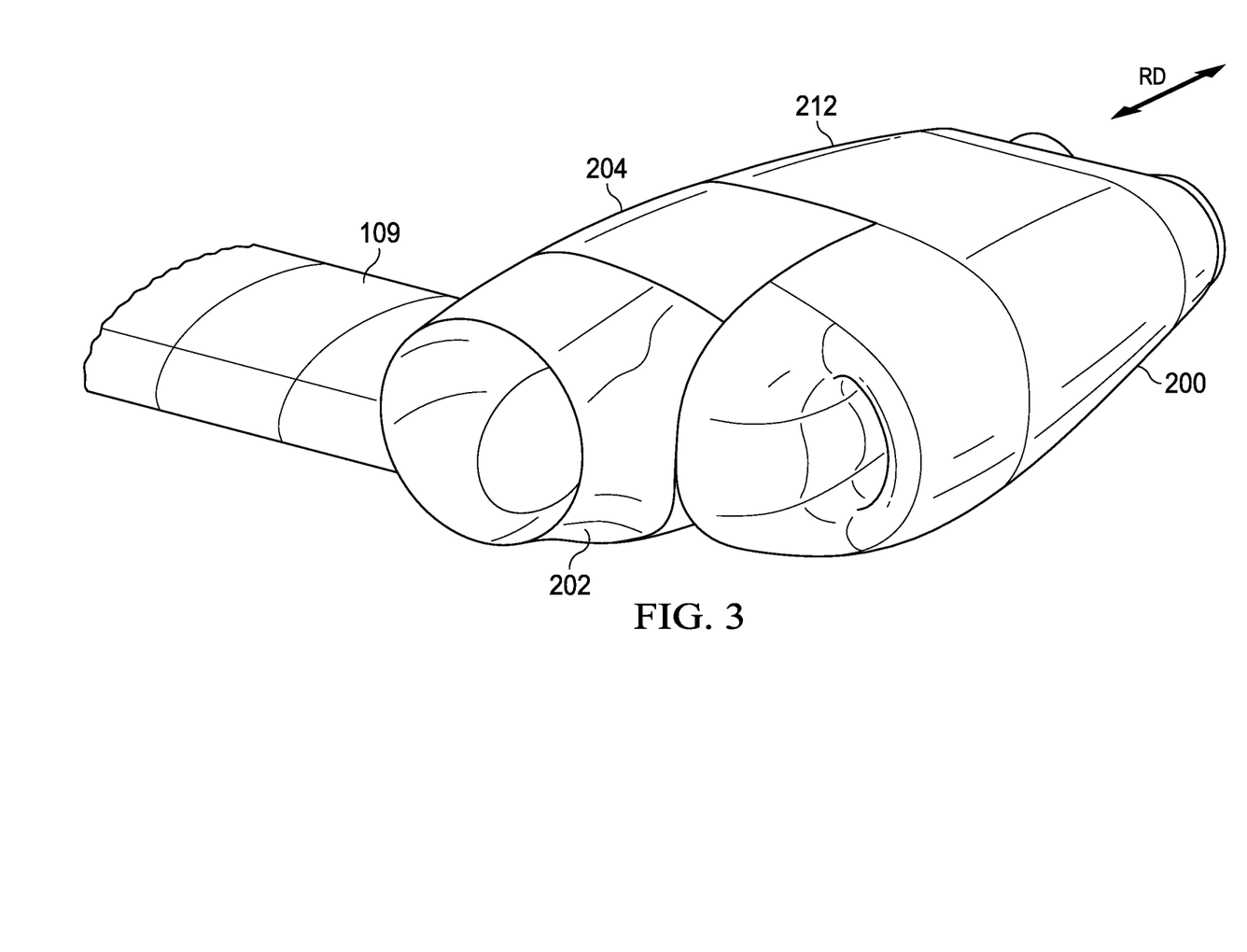
FIG. 3 is a partial perspective view of a nacelle and a PRGB door in forward flight mode, according to one example embodiment.

A PRGB door 204 is connected between the fixed portion 200 and the proprotor housing 202, FIGS. 2 and 3. The PRGB door 204 is movable in response to rotation of the movable proprotor housing 202. In the forward flight mode, the PRGB door 204 is closed to cover the mechanical components enclosed within the fixed portion 200 of the respective nacelle 111a and 113a. In the vertical flight mode or a conversion (transition) mode, the PRGB door 204 is at least partially opened to accommodate movement (rotation) of the movable proprotor housing 202.

Figure 4:
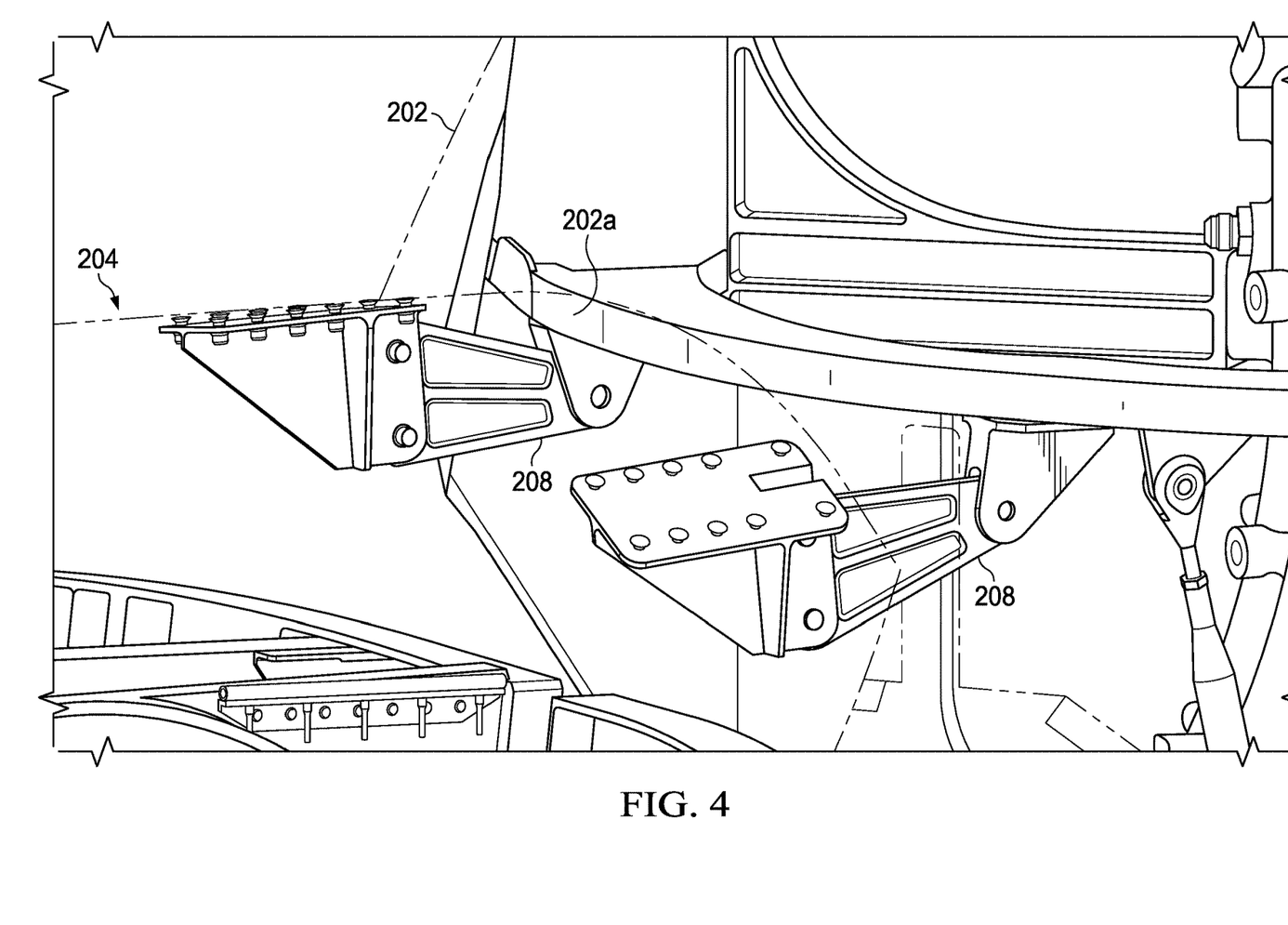
FIG. 4 is a partial view of a PRGB door and hinge fittings converted to the fully vertical flight mode, according to one example embodiment.
Figure 5:
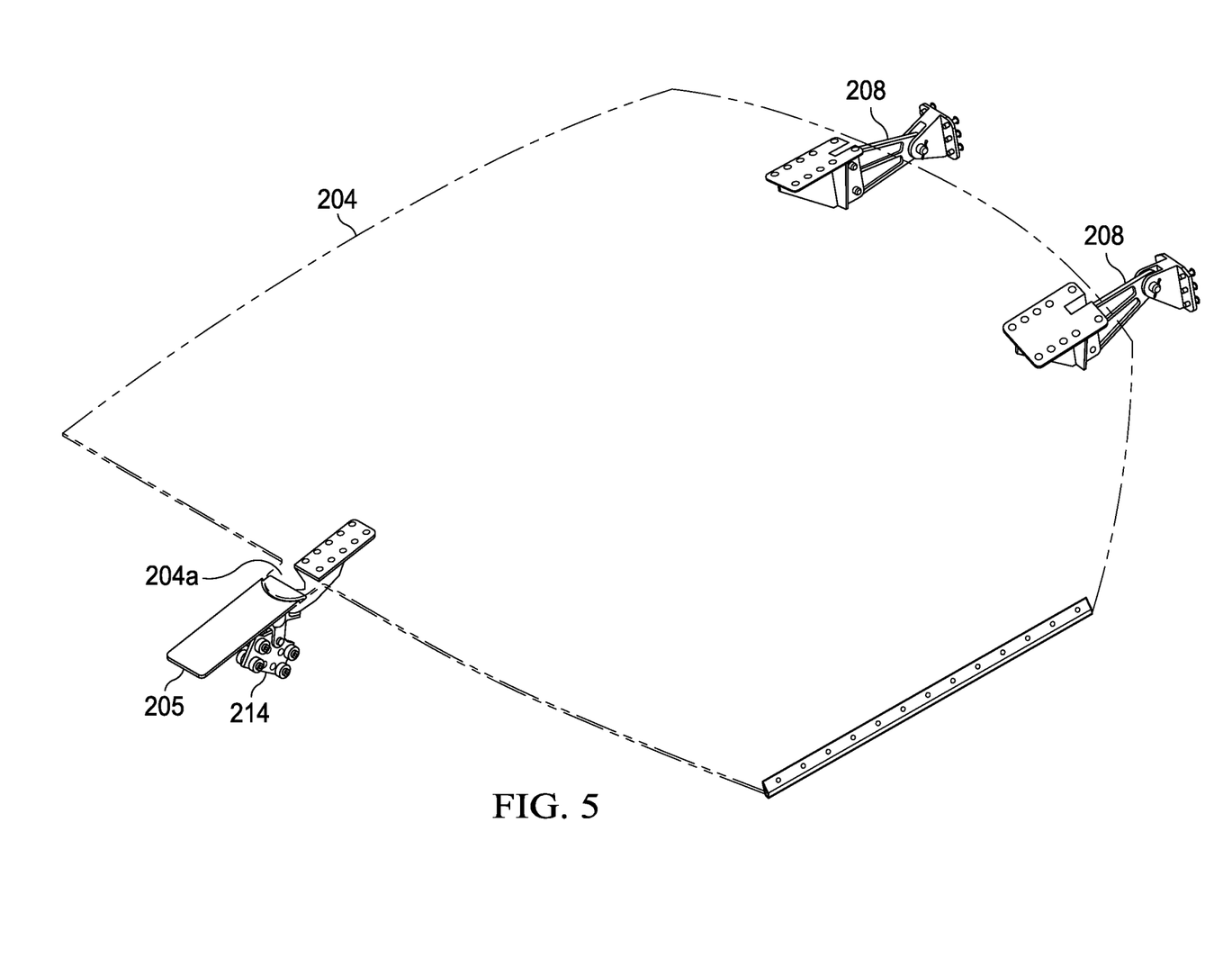
FIG. 5 is a perspective view of a PRGB door and hinge fittings for connecting to the PRGB system and with a bogie mechanism, according to an example embodiment.
Figure 7:
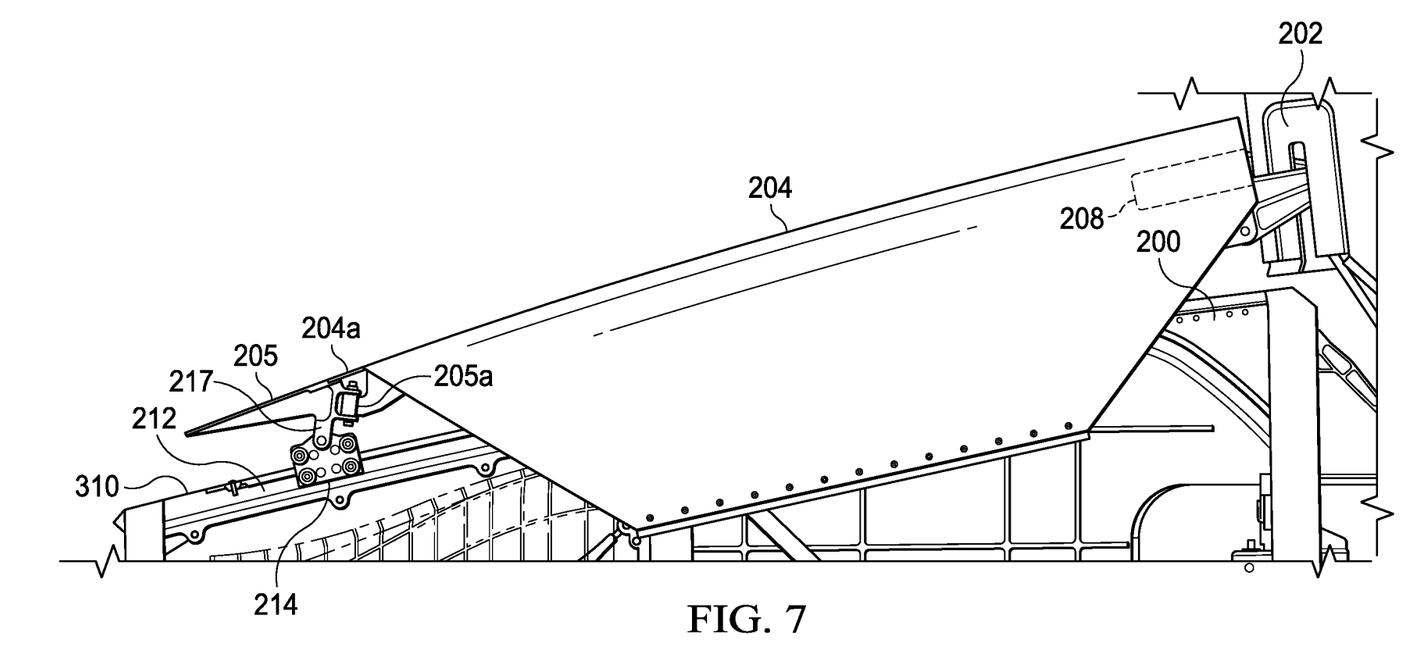
FIG. 7 is a partial elevation view of a PRGB door in the open position for vertical flight mode, according to an exemplary embodiment.

In certain exemplary embodiments offered for purposes illustration and not limitation, the PRGB door 204 is connected at one end to the frame 202a of the proprotor housing 202 by hinge fittings 208, FIGS. 4, 5, and 7, or other connector mechanism that allows the proprotor housing 202 to be rotated relative to the fixed portion 200 of the respective nacelle 111a, 113a.

Each of the PRGB doors 204 are connected to the fixed portion 200 of the respective nacelle 111a and 113a by a roller track assembly 211 including a roller track 212 fixedly mounted externally to the fixed portion 200 and a door roller mechanism 214 that rides on the roller track 212. In an embodiment, the roller track 212 is mounted in and/or on the fixed portion 200 of the respective nacelle 111a and 113a. The roller track 212 can be attached by fasteners to bulkheads and/or frames 200a of the respective nacelle 111a and 113a support structure, FIG. 6. The roller track 212 defines a rolling direction RD of the PRGB door 204, FIGS. 3 and 6, in response to rotation to the proprotor housing 202 during conversion between the forward flight mode and the vertical flight mode of the aircraft. That is, the PRGB door 204 can move back and forth in the rolling direction RD in response to rotation of the proprotor housing 202 during flight mode transitions.

Figure 6:
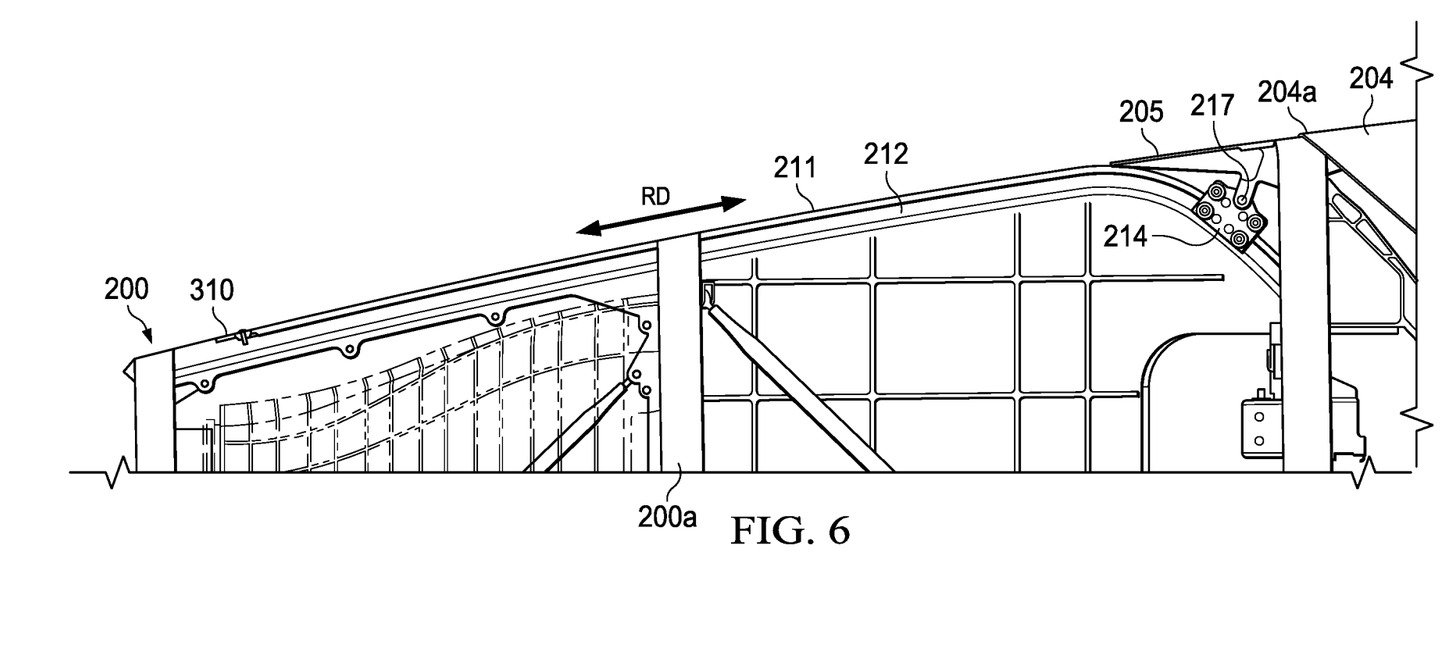
FIG. 6 is a partial elevation view of a PRGB door in the closed position for forward flight mode, according to an exemplary embodiment.

In certain embodiments, the door roller (bogie) mechanism 214 is connected to structural extension 205 of the PRGB door 204, FIGS. 6 and 7, as described below through a swivel joint 205a. The door roller mechanism 214 is an assembly that can include a carriage member 215 having a door attachment feature 217 that is connected to the structural extension 205 of the PRGB door 204, FIGS. 6 and 7. In certain embodiments, the carriage member 215 includes an upstanding plate including corrosion resistant stainless (CRES) steel or other suitable material. In certain embodiments, the door attachment feature 217 can comprise a spherical bearing 223 connected to the PRGB door structural extension 205, as shown in FIGS. 8-9.

Figure 8:
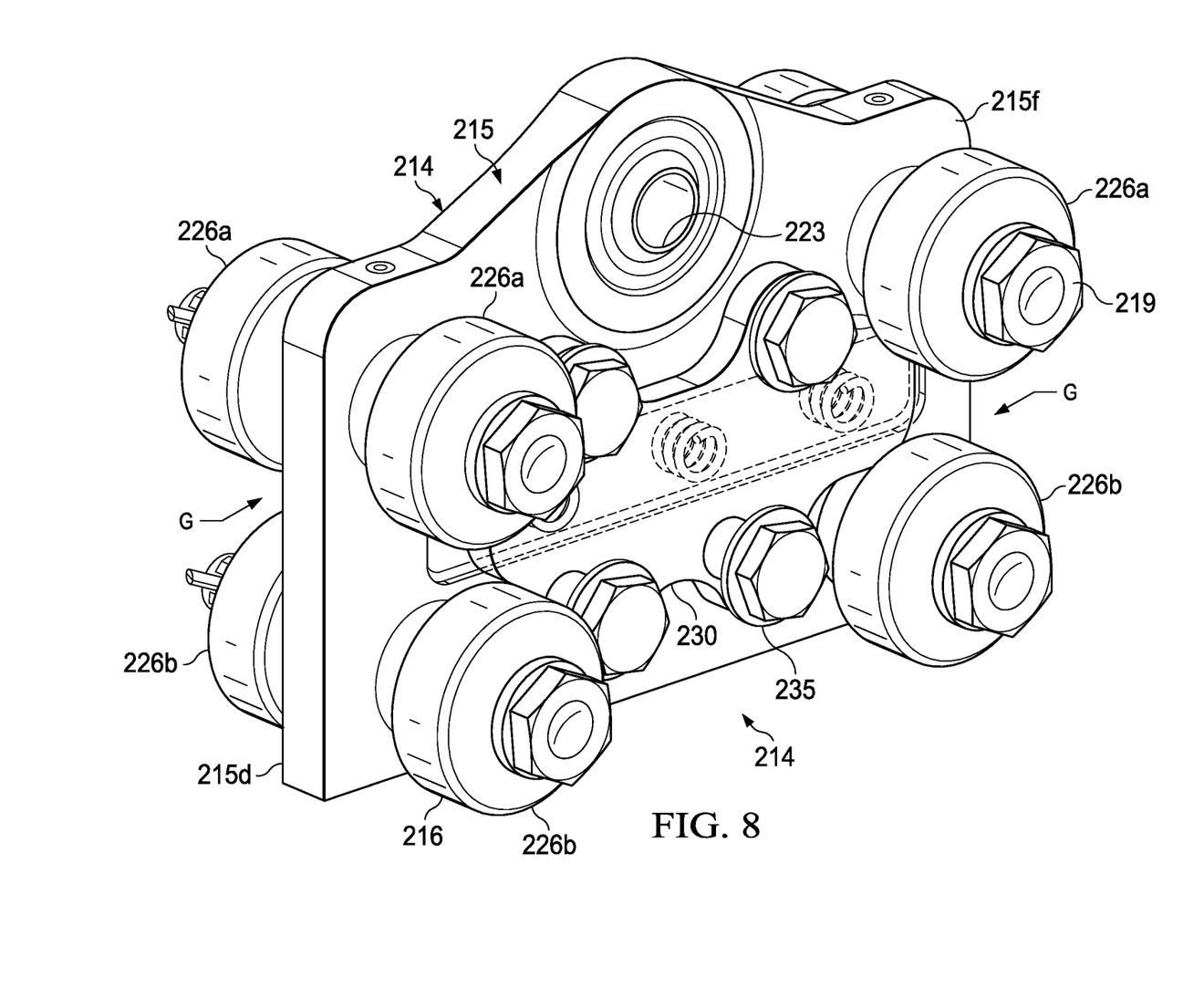
FIG. 8 is a perspective view of an assembled door roller mechanism, according to an exemplary embodiment.
Figure 9:
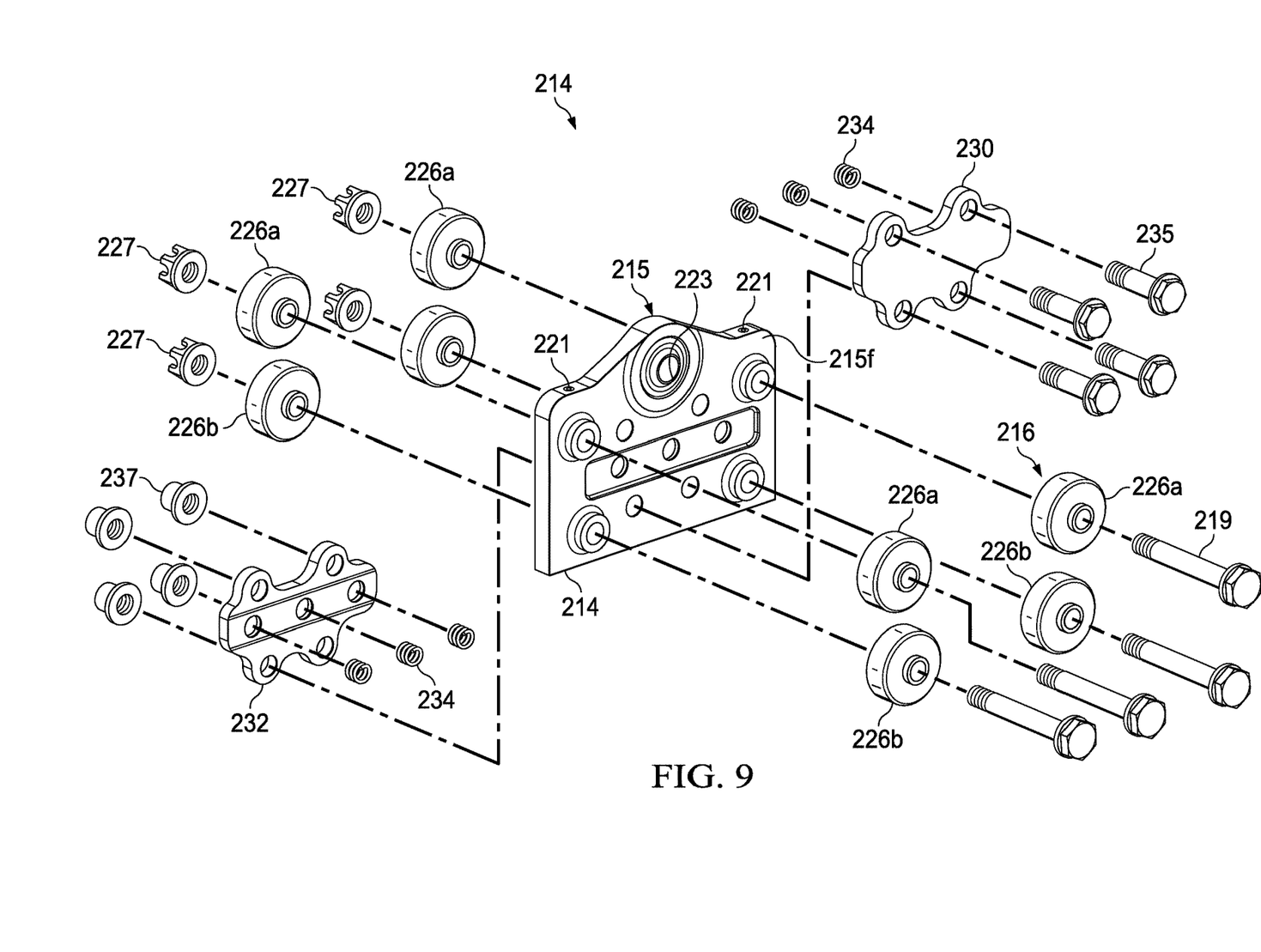
FIG. 9 is an exploded view of a door roller mechanism, according to an exemplary embodiment.

Referring to FIGS. 8-9, at least one roller 216 is disposed for rotation on a first side 215f and on an opposite second side 215d of the carriage member 215 when the carriage member 215 is moved in the rolling direction RD. In certain embodiments, the at least one roller 216 includes multiple upper forward and aft rollers 226a and multiple lower forward and aft rollers 226b disposed on each of the first side 215f and the second side 215d of the carriage member 215. The multiple upper forward and aft rollers 226a and multiple lower forward and aft rollers 226b are separated by a space G adapted to receive a respective first and second track members 320 and 322 described below. In certain embodiments, these rollers 226a, 226b are arranged in a rectangular pattern on each of the first side 215f and the second side 215d of the carriage member 215 as depicted in FIGS. 8-9 in order to withstand non-linear (angular directed) forces exerted on the PRGB door 204 during aircraft operation. It is contemplated that the roller 216 could include a plurality of rollers in various configurations (triangular, square, hexagonal patterns) that can withstand non-linear (angular directed) forces exerted on the PRGB door 204.

Each roller 216 can be rotatably mounted on a respective fastener shaft 219 that can be a through bolt and clamped up to the carriage member 215. In an embodiment, each fastener shaft 219 extends through a respective passage through the carriage member 215 from one side to the other and includes a threaded end connected to a respective threaded nut 227. Although the upper roller 226a on the first side 215f and the upper roller 226a on the second side 215d of the carriage member 215 are shown disposed on a common fastener shaft 219 for rotation, each roller can be mounted by a respective individual fastener for rotation on the carriage member 215. In one embodiment, each roller 216 can be a self-contained ball bearing with a non-rotating inner portion and a rotating outer portion positioned tight against the carriage member 215. In certain exemplary embodiments, the rollers 226a, 226b are made of corrosion resistant steel or other suitable material.

The initial positions of the upper rollers 226a are adjusted by set screws 221 that are slotted vertically in the carriage member 215. The set screws 221 limit the range of travel of the bolts 219 for the upper rollers 226a, which sets the distance between the upper rollers 226a and lower rollers 226b.

Referring again to FIGS. 8 and 9, first and second rub members 230, 232 are disposed on the respective first and second sides 215f, 215d of the carriage member 215 and are resiliently biased laterally outward away from the carriage member 215 by one or more biasing elements 234 disposed between the rub members 230, 232 and corresponding first or second side 215f, 215d of the carriage member 215. In certain embodiments, the rub members 230, 232 are each slidably mounted on multiple fastener shafts 235 (four shown). In certain embodiments, each of the rub members 230, 232 can be slidably mounted on the respective fastener shaft by a bushing. The rub members 230, 232 can be resiliently biased to contact respective first and second sidewalls 320s, 322s of the respective track members 320, 322 in a manner to be described below. Each fastener shaft 235 extends through a respective passage in the corresponding rub member 230, 232 and through the carriage member 215 from one side to the other and includes a threaded end connected to a respective threaded nut 237.

In certain embodiments, the rub members 230, 232 are each spring biased by multiple coil bias springs (three shown in FIG. 9). The rub members 230, 232 are spring biased in opposite lateral directions generally perpendicular relative to the door rolling direction RD so as to contact the respective first and a second sidewalls 320s, 322s, of the track members, FIGS. 10 and 12, in a manner to dampen lateral vibrations of the PRGB door 204 attached to the roller assembly. Although multiple individual biasing springs are shown between each rub member 230 and 232 and the carriage member 215, alternative embodiments envisions use of a single spring configuration that is disposed in a carriage member through-hole (not shown) between the rub members 230, 232 to bias both of the rub members. Moreover, other types of springs, such as leaf, cantilever, and other springs, can be used in certain embodiments. Further, resilient biasing elements other than springs, such as one or more resilient bodies located as described above, can be used in practice of certain embodiments.

The rub members 230, 232 can have a plate shape as depicted or any other suitable shape. In certain embodiments, the rub members 230 and 232 are made of aluminum-bronze alloy material, although any suitable material can be employed. An anti-friction coating optionally can be applied on the outer surfaces of the rub members 230, 232. The anti-friction coating can be an anti-friction self-lubricating polymeric composite liner in certain embodiments. In an embodiment, the anti-friction coating is Rexton 2000, which is a self-lubrication liner made by Rexnord Corporation.

In certain embodiments, the roller track assembly 211 includes a housing 300 having flanges 302 and 303 with fastener holes. The housing flanges 302, 303 are fastened to bulkheads and/or frames 200a of the fixed portion 200 of the respective nacelle 111a and 113a structure using fasteners through the fastener holes. In certain embodiments, the housing 300 is made in two halves which are assembled using fasteners received in holes in housing alignment flanges 305 shown in FIG. 10, although the housing 300 can be made in one piece or any number of multiple other pieces. The assembled housing 300 is precision located on the fixed portion 200 by laser tracking although conventional assembly methods using determinate assembly holes or tooling can be used. The assembled housing 300 defines the door rolling direction RD for the PRGB door 204 opening and closing.

The housing 300 includes a longitudinal channel 304 extending along its length. The channel 304 includes a first entry end 304a and a second end forming a deep stowage recess 304b, FIGS. 10 and 11. The entry end 304a is adapted to receive the door roller mechanism 214 during assembly of the door connection mechanism. To this end, the entry end 304a includes an initial converging lead-in entrance 306 that communicates to a descending ramp insert 308, FIG. 12, to facilitate sliding of the rub members 230, 232 of the door roller mechanism 214 into the channel 304. After assembly, the top of the entry end 304a is closed off by a cover plate 310 that prevents the door roller mechanism 214 from disengaging from the door track assembly as the proprotor housing 202 is fully converted to the vertical flight mode during operation of the aircraft. Fasteners shown in FIG. 12 are used to attach the lead-in ramp insert 308 and the cover plate 310 to the housing 300.

Figure 10:
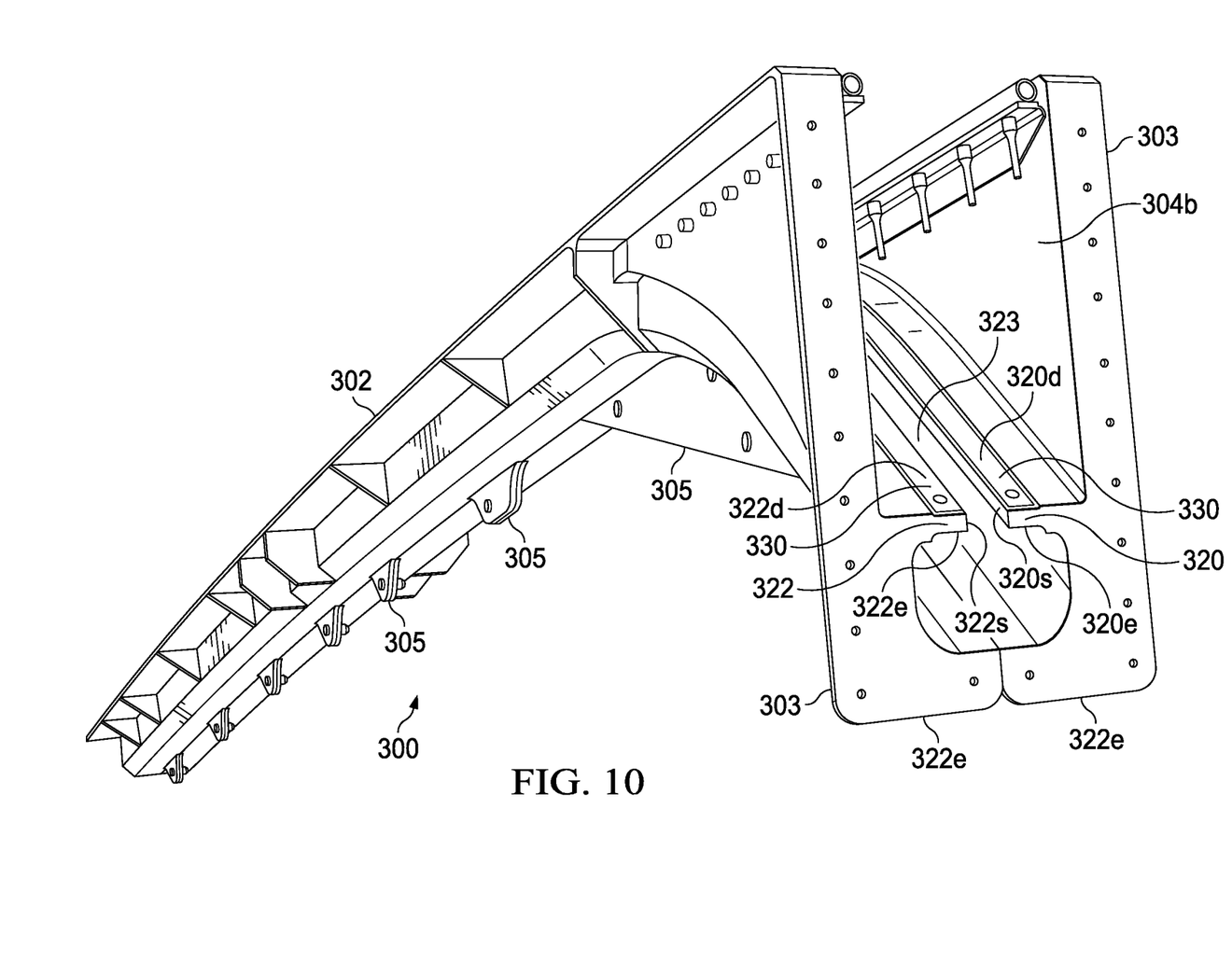
FIG. 10 is a perspective view of a track housing, according to an exemplary embodiment.
Figure 11:
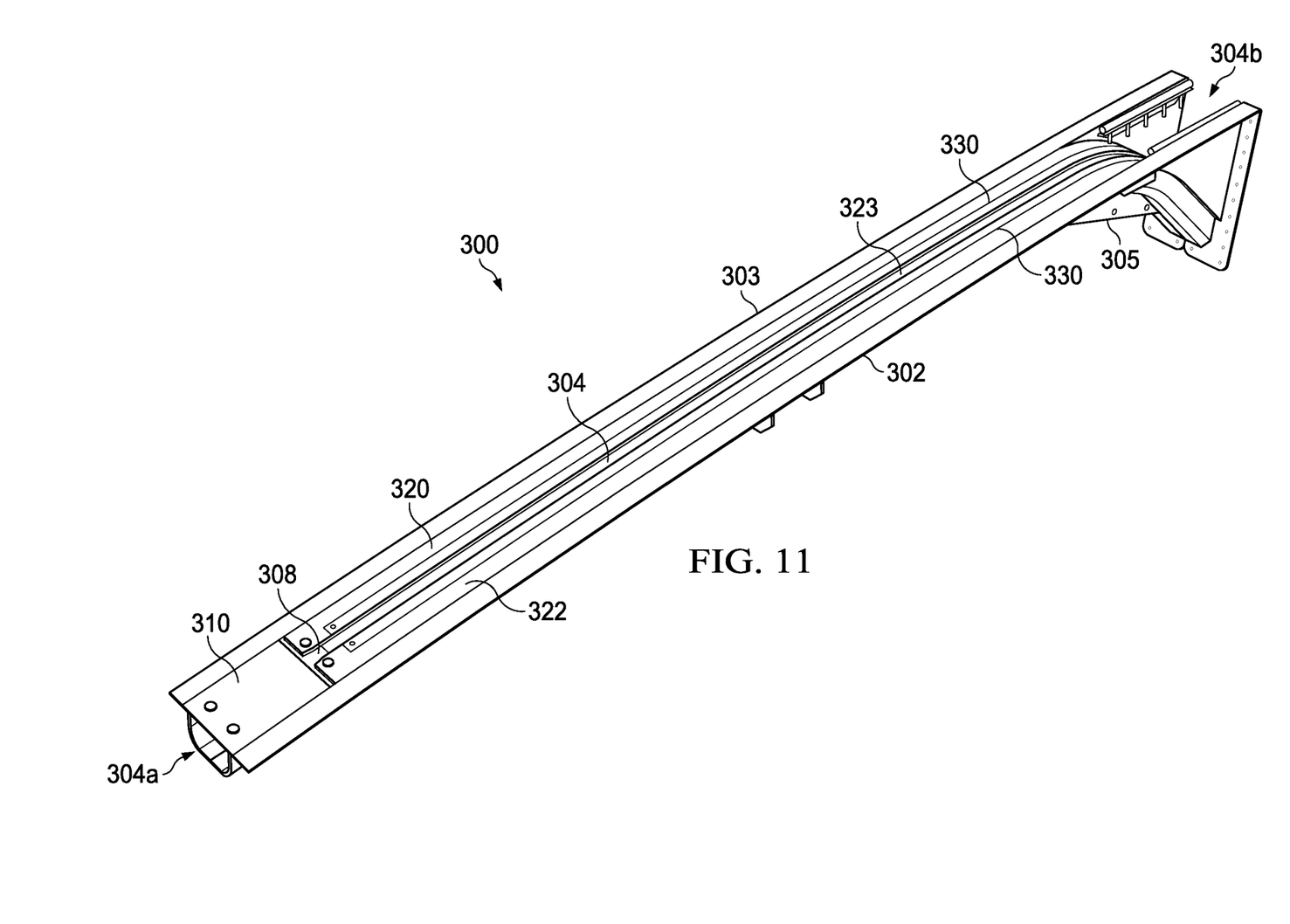
FIG. 11 is a perspective view of a roller track in a track housing, according to an exemplary embodiment.
Figure 12:
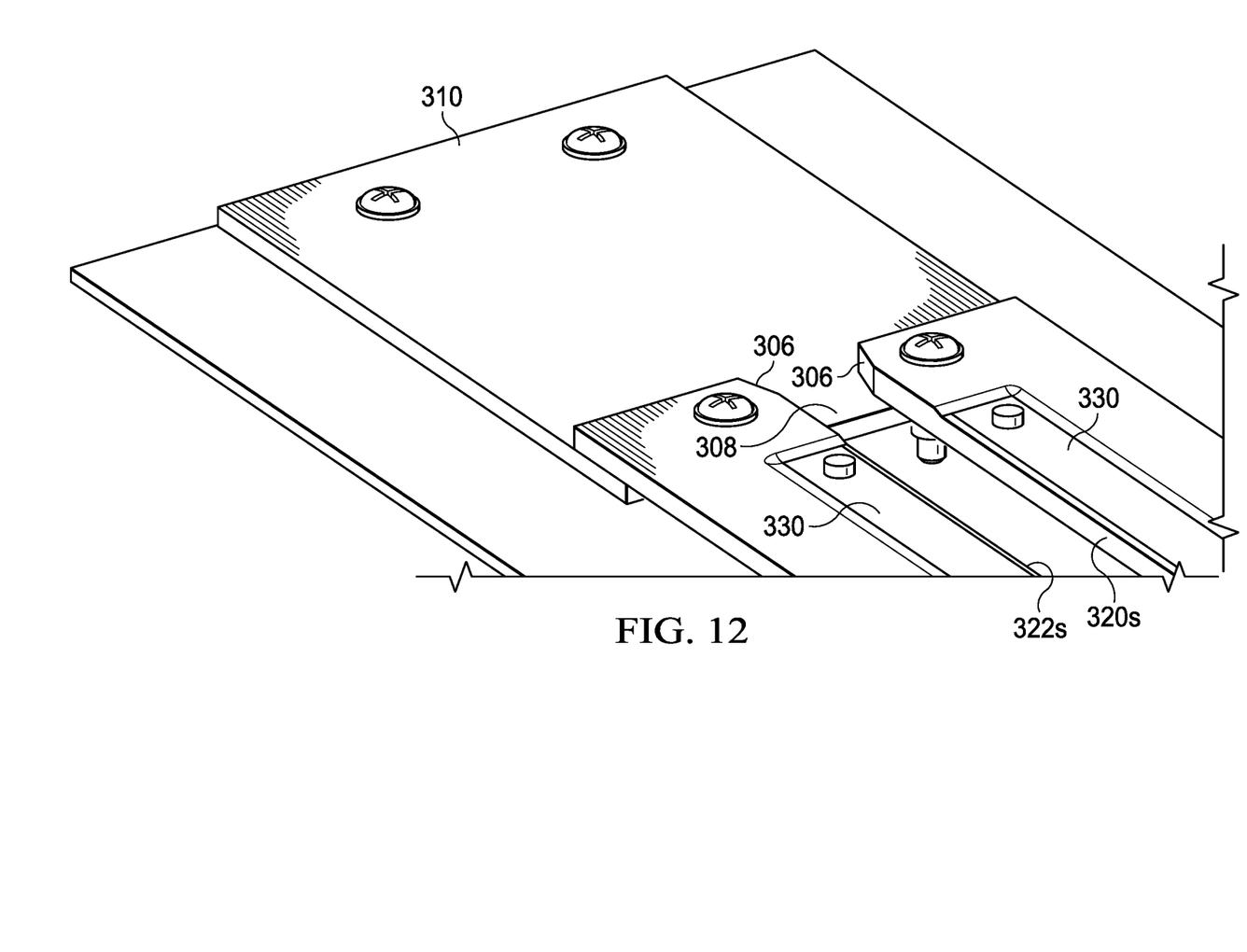
FIG. 12 is an enlarged perspective view of an entry end of the roller track assembly where the roller mechanism is inserted for riding on roller track surfaces, according to an exemplary embodiment.

Referring to FIGS. 10-12, the housing 300 includes first and second tracks 320, 322, which may be integral with or separate and connected to the respective housing flange 303, 302. The tracks 320, 322 receive the rollers 226a, 226b of the door roller mechanism 214 and extend generally parallel to one another along the length of the channel 304 until they curve and descend at the remote end of the housing into the deep stowage recess 304b, whose shape and depth is selected to completely stow the door roller mechanism 214 out of the way when the PRGB door 204 is moved to the closed position during the forward flight mode, FIG. 6.

The first and second tracks 320, 322 extend inwardly from facing inner walls of the housing 300 toward one another in a common substantially horizontal plane and terminate short of one another to form a secondary channel 323 therebetween, FIGS. 10-12, through which the rub members 230, 232 of the carriage member 215 of the door roller mechanism 214 traverse.

The first and second tracks each includes a respective upwardly facing surface 320d, 322d and downwardly facing surface 320e, 322e. These surfaces extend along the length of the tracks into the stowage recess 304b. Referring again to FIGS. 10-12, in certain embodiments, a wear resistant strip insert 330 is fastened to each of upwardly facing surfaces and downwardly facing surfaces 320d, 322d; 320e, 322e to form wear resistant roller track surfaces. The wear resistant strip inserts 330 are employed when the housing 300 is made of material, such as an aluminum alloy, that may suffer excessive wear from the carriage member rollers 216 riding thereon during operation of the door roller mechanism 214. The wear resistant strip inserts are attached by fasteners shown best in FIG. 12 that are spaced apart along the length of the tracks 320, 322. In certain embodiments, the wear resistant strip inserts 330 are made of CRES steel (the same material as the roller material), although other suitable wear resistant materials can be used to this same end.

In certain other embodiments, the wear resistant strip inserts 330 may be omitted if the housing 300 is made of a more wear resistant material, or if the housing is provided with more wear resistant roller track surfaces on the tracks 320, 322 by, for example, localized deposition of a wear resistant track material on the tracks, localized heat treatment (e.g. localized laser hardening) of the tracks, or other localized surface hardening treatments to this end.

The first and second tracks 320, 322 also include substantially vertical and parallel sidewalls 320s, 322s that face one another and are spaced apart to define the secondary channel 323 that receives the rub members 230, 232 of the carriage member plate 215. The sidewalls 320s, 322s are termed rubbed sidewalls in that the rub members 230, 232 are resiliently biased by the springs or other biasing elements 234 to contact these sidewalls as the door roller mechanism 214 traverses back and forth along the roller tracks 320, 322 in the rolling direction RD.

Each of the sidewalls 320s, 322s includes an anti-friction coating thereon to reduce fretting damage and/or wear resulting from contact with the rub members 230, 232. An illustrative anti-friction coating to this end comprises a composite coating including a matrix material having anti-friction polymer particles dispersed in the matrix material, although other suitable composite or non-composite anti-friction coatings can be used. In certain embodiments, when the tracks 320, 322 of the housing 300 comprises an aluminum alloy, a suitable composite coating comprises an anodized aluminum (aluminum oxide) layer as the matrix material and polytetrafluoroethylene (PTFE) particles dispersed in the anodized layer. Such a coating can be formed on the surfaces of sidewalls 320s, 322s by spraying or other suitable process.

Practice of certain embodiments is advantageous in that unwanted vibrations of the PRGB door 204 are dampened during operation of the tiltrotor aircraft.

Moreover, pursuant to certain embodiments, the cover plate 310 prevents disengagement of the door roller mechanism 214 from the roller track assembly 211 as the proprotor housing 202 is fully converted to the vertical flight mode during operation of the aircraft, FIG. 7. Further, when the proprotor housing 202 is fully converted to the forward flight mode, the PRGB door structural extension 205 covers the stowage recess 304b and door roller mechanism 214, FIG. 6. The PRGB door 204 includes an integral tail section 204a that is fastened on the structural extension 205 to this same end.

Practice of certain embodiments is advantageous for use with the PRGB door of a tiltrotor aircraft of the type described to dampen lateral door vibrations. However, the embodiments herein are not limited to practice in connection with tiltrotor aircraft PRGB doors and can be practiced with respect to other door applications for aircraft, helicopters, and other non-aircraft vehicles to dampen unwanted lateral door vibrations.

At least one embodiment is disclosed and variations, combinations, and/or modifications of the embodiment(s) and/or features of the embodiment(s) made by a person having ordinary skill in the art within the scope of the disclosure. Alternative embodiments that result from combining, integrating, and/or omitting features of the embodiment(s) are also within the scope of the disclosure. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A door system for a tiltrotor aircraft, the tiltrotor aircraft including a moveable proprotor housing that rotates relative to a fixed engine nacelle from a forward flight mode to a vertical flight mode, comprising:
   a door roller mechanism including a plurality of rollers arranged on a carriage member; and
   a track assembly mounted externally to a top surface of the fixed engine nacelle, the track assembly including:
      a housing having a longitudinal channel along a length of the housing, wherein the channel descends at an end of the housing to form a deep stowage recess for the door roller mechanism, the housing mounted to the fixed engine nacelle such that the deep stowage recess is adjacent to the movable proprotor housing, and
      a first track and a second track that are disposed on the housing along a length of the channel and that descend into the stowage recess and along which the plurality of rollers of the door roller mechanism traverses;
   wherein when the movable proprotor housing is in a forward flight mode, the door roller mechanism is completely stowed in the deep stowage recess.

2. The door system of claim 1, wherein the first track and the second track include a respective first sidewall and second sidewall, the first sidewall and the second sidewall having an anti-friction coating thereon.

3. The door system of claim 2, wherein each anti-friction coating comprises a matrix material and an anti-friction polymer material in the matrix.

4. The door system of claim 3, wherein the matrix material comprises an anodized layer.

5. The door system of claim 3, wherein the polymer material comprises polytetrafluoroethylene particles.

6. The door system of claim 1, wherein the first track and the second track each has an upwardly facing wear insert thereon and a downwardly facing wear insert thereon.

7. The door system of claim 6, wherein each wear insert provides a wear resistant roller track surface.

8. The door system of claim 1, wherein the channel includes an entry end having a converging entrance leading to a descending ramp insert.

9. The door system of claim 8, wherein a cover member is disposed on top of the entry end.

10. The door system of claim 1, wherein the aircraft nacelle further comprises a movable proprotor gearbox system.

\* \* \* \* \*